United States Patent
Chiu et al.

(10) Patent No.: US 8,013,715 B2
(45) Date of Patent: Sep. 6, 2011

(54) CANCELING SELF-JAMMER SIGNALS IN AN RFID SYSTEM

(75) Inventors: Scott Chiu, Folsom, CA (US); Mohammed Sajid, Sacramento, CA (US); Issy Kipnis, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 1103 days.

(21) Appl. No.: 11/771,231

(22) Filed: Jun. 29, 2007

(65) Prior Publication Data

US 2009/0002131 A1 Jan. 1, 2009

(51) Int. Cl.
*H04Q 5/22* (2006.01)
*G08B 13/14* (2006.01)
*H04B 1/10* (2006.01)

(52) U.S. Cl. .................. 340/10.3; 340/10.5; 340/572.4; 455/296

(58) Field of Classification Search ........................ None
See application file for complete search history.

(56) References Cited

U.S. PATENT DOCUMENTS

| | | | |
|---|---|---|---|
| 6,107,910 A * | 8/2000 | Nysen ........................... | 340/10.1 |
| 6,640,194 B2 | 10/2003 | Little et al. | |
| 7,035,365 B2 | 4/2006 | Takatori et al. | |
| 7,154,979 B2 | 12/2006 | Takatori et al. | |
| 7,526,266 B2 * | 4/2009 | Al-Mahdawi ................. | 455/296 |
| 7,574,188 B2 * | 8/2009 | Kim .............................. | 455/296 |
| 7,629,886 B2 * | 12/2009 | Steeves ...................... | 340/572.1 |
| 7,671,720 B1 * | 3/2010 | Martin et al. ................. | 340/10.1 |
| 7,684,751 B2 * | 3/2010 | Posamentier .................... | 455/1 |
| 2006/0098765 A1 * | 5/2006 | Thomas et al. ............... | 375/346 |
| 2007/0072567 A1 * | 3/2007 | Nagai et al. ................... | 455/205 |
| 2007/0206704 A1 * | 9/2007 | Zhou et al. ................... | 375/316 |
| 2007/0207831 A1 | 9/2007 | Tinsley et al. | |
| 2008/0009258 A1 * | 1/2008 | Safarian et al. .............. | 455/307 |
| 2008/0079547 A1 * | 4/2008 | Alicot et al. ................. | 340/10.3 |

OTHER PUBLICATIONS

Lee, Jeiyoung et al., "A UHF Mobile RFID Reader IC With Self-Leakage Canceller", 2007 IEEE Radio Frequency Integrated Circuits Symposium, (2007), pp. 273-276.
Safarian, Aminghasem et al., "An Integrated RFID Reader", 2007 IEEE International Solid-State Circuits Conference, (2007), pp. 218-219, 598.
Scott, Chiu "A Method for Detecting Self-Jammer Power Level Under the Presence of Blockers", filed May 31, 2007, USPTO U.S. Appl. No. 11/756,326.
Scott, Chiu et al., "Filter Scheme for Receiver", filed Dec. 20, 2006, USPTO U.S. Appl. No. 11/613,986.
Scott, Chiu et al., "Reducing Amplitude Modulated Noise for a Wireless Transceiver", filed Jun. 29, 2007, USPTO U.S. Appl. No. 11/771,374.
Shameli, Amin et al., "An RFID System With Fully Integrated Transponder", 2007 IEEE Radio Frequency Integrated Circuits Symposium, (2007), pp. 285-288.
"IMPINJ", Impinj RFID, http://www.impinj.com/rfid/default.aspx,(2007), pp. 1-2.

* cited by examiner

*Primary Examiner* — George Bugg
*Assistant Examiner* — Renee Dorsey
(74) *Attorney, Agent, or Firm* — Cool Patent, P.C.; Joseph P. Curtin

(57) ABSTRACT

A device and method for canceling one or more self-jammer signals in a radio-frequency identification system.

12 Claims, 3 Drawing Sheets ically 715 B2

CANCELING SELF-JAMMER SIGNALS IN AN RFID SYSTEM

BACKGROUND

Radio-frequency identification (RFID) systems are capable of wireless data transmissions between an RFID reader and an RFID tag. In a typical RFID system employing passive RFID tags, an RFID reader communicates a signal to an RFID tag. The RFID tag returns the signal by backscattering the signal. The backscattered signal may couple with the signal sent from the RFID reader transmitter, thereby generating a signal blocker called a self-jammer signal. A self-jammer signal may be difficult to detect and may interfere with the RFID reader's reception of the backscattered signal.

DETAILED DESCRIPTION

In the following detailed description, numerous specific details are set forth in order to provide a thorough understanding of claimed subject matter. It will, however, be understood by those skilled in the art that claimed subject matter may be practiced without these specific details. In other instances, well-known methods, procedures, and components have not been described in detail so as not to obscure claimed subject matter.

Although, the embodiments described herein refer to detection and cancellation of self-jammer signals in an RFID system, such embodiments are meant for illustrative purposes and are not intended to limit the scope of the disclosure. The disclosed device and method is useful for detection and cancellation of interfering signals in any of a variety of wireless systems, such as in mobile communications or networking in compliance with the Wi-Fi Alliance, for instance. In this disclosure, interfering signals may be referred to as unwanted signals. Such unwanted signals, in a particular embodiment of a wireless system, may be referred to as "signal blockers," "self-jammer signals," "adjacent channel blockers," "co-channel blockers" and/or "interfering signals." Such unwanted signals may cause a disturbance in the normal operation of the wireless system, resulting in errors and degrading system performance. According to a particular embodiment of a wireless system, a circuit capable of canceling unwanted signals may be referred to herein as a "cancellation loop."

Figure 1:
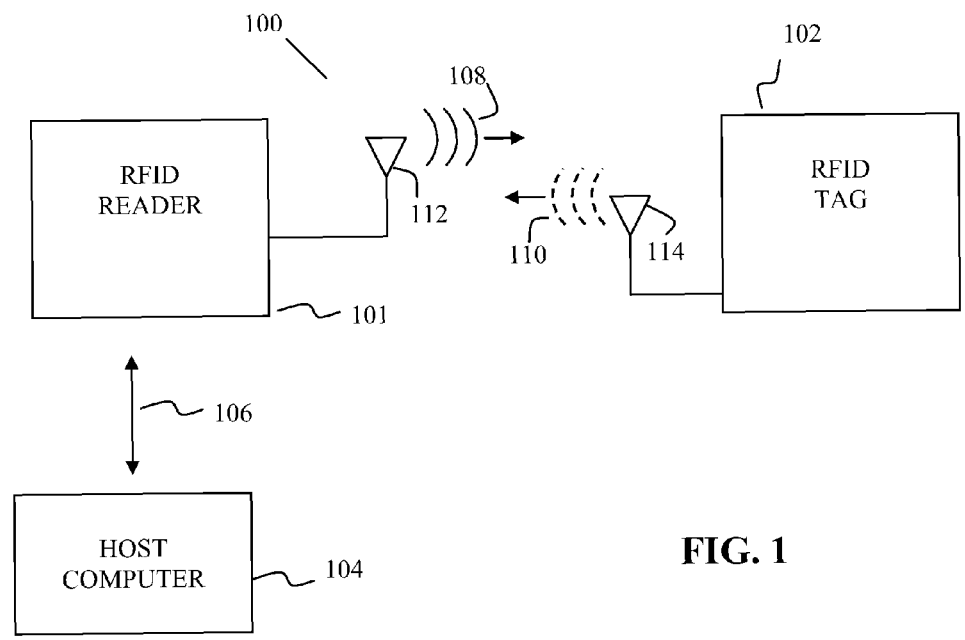
FIG. 1 is a schematic diagram representing an arrangement of an RFID system.

FIG. 1 is a schematic diagram illustrating a particular embodiment of a wireless system. In a particular embodiment, RFID system 100 may comprise RFID reader 101, RFID tag 102 and host computer 104. According to a particular embodiment, RFID reader 101 may transmit an interrogation signal 108 that may be received by RFID tag 102. According to a particular embodiment, RFID tag 102 may modulate and then reflect interrogation signal 108 sent by the RFID reader 101. RFID tag 102 may return interrogation signal 108 back to RFID reader 101 by a variety of methods, such as, for instance, by backscattering interrogation signal 108 to generate backscattered interrogation signal 110. In a particular embodiment, RFID reader 101 may then communicate data 106 received from RFID tag 102 to host computer 104 for processing. This is, however, merely an example of a configuration of a wireless system and claimed subject matter is not so limited.

RFID system 100 may operate in a variety of applications such as, for example, product tracking and animal identification. In a product tracking application, RFID tag 102 may be coupled to a product. The tagged product may then be tracked by RFID reader 101 without having to remove the product from packaging. In an animal identification application, RFID tag 102 may be implanted under the skin of an animal. RFID tag 102 may be read by RFID reader 101 in order to identify the animal bearing RFID tag 102. These are, however, merely examples of applications for RFID systems and claimed subject matter is not limited in this regard.

In a particular embodiment, RFID tag 102 may be a passive tag. Passive RFID tag 102 may operate using power derived from interrogation signal 108 sent by RFID reader 101. This is, however, merely an example of an RFID system employing a passive RFID tag and claimed subject matter is not so limited. For instance, RFID tags may also be active or semi-active and may require a power source in order to operate.

Referring still to FIG. 1, RFID reader 101 may comprise antenna 112. In a particular embodiment, antenna 112 may be capable of sending and/or receiving a signal to and/or from RFID tag 102. According to a particular embodiment, RFID tag 102 may comprise antenna 114. Antenna 114 may be capable of receiving interrogation signal 108 from RFID reader 101 and sending backscattered interrogation signal 110 to RFID reader 101. In a particular embodiment, RFID tag 102 may be capable of communicating data to RFID reader 101 via backscattered interrogation signal 110. This is, however, merely an example of capabilities and configurations of RFID reader antennas and RFID tag antennas and claimed subject matter is not so limited. For instance, both RFID readers and RFID tags may have more than one antenna and/or may be capable of sending and/or receiving one or more signals.

According to a particular embodiment, RFID reader 101 may comprise a variety of transmitters (not shown), receivers (not shown), transponders (not shown) and/or transceivers (not shown) capable of transmitting and/or receiving radio frequency (RF) signals. Additionally, RFID tag 102 may comprise a variety of transmitters (not shown), receivers (not shown), transponders (not shown) and/or transceivers (not shown) capable of transmitting and/or receiving radio frequency (W) signals. This is, however, merely an example of various components that may comprise an RFID reader or RFID tag and claimed subject matter is not so limited.

In a particular application, RFID reader 101 may receive backscattered interrogation signal 110 from RFID tag 102 in the presence of other radio frequency emitting devices (not shown) such as, for instance, other RFID readers operating in the same radio frequency. In this example, RFID reader 101 may experience adjacent channel and co-channel interference (see description in FIG. 2) which may be caused by signals transmitting, for instance, from other RFID devices operating in the vicinity of RFID reader 101.

According to a particular embodiment, in an RFID system 100, an interfering signal may be generated in a variety of ways. In a particular embodiment, when RFID reader 101 receives signals, a carrier signal from the RFID reader transmitter (not shown) and the carrier signal reflected from antenna 112 may couple generating a "self-jammer signal." Such coupling may be due to antenna 112 impedance mismatch and/or isolation. Additionally, a self-jammer signal may be generated by transmitter to receiver coupling. Such coupling may occur in the antenna system of RFID reader 101 or may occur elsewhere within the RFID reader. According to a particular embodiment, a self-jammer signal may be an amplitude and phase-shifted version of the signal generated by the local oscillator in RFID reader 101. According to a particular embodiment, one or more self-jammer signals may be generated in RFID system 100 comprising multiple transmitters and/or multiple antennas. Additionally, various self-jammer signals may be generated in RFID system 100 at various times. For instance, at time $t_1$ a first self-jammer signal may be generated in a particular embodiment of RFID system 100 and at time $t_2$ a second self-jammer signal may be generated. These are, however, merely examples of self-jammer signals in an RFID system and claimed subject matter is not so limited.

Figure 2:
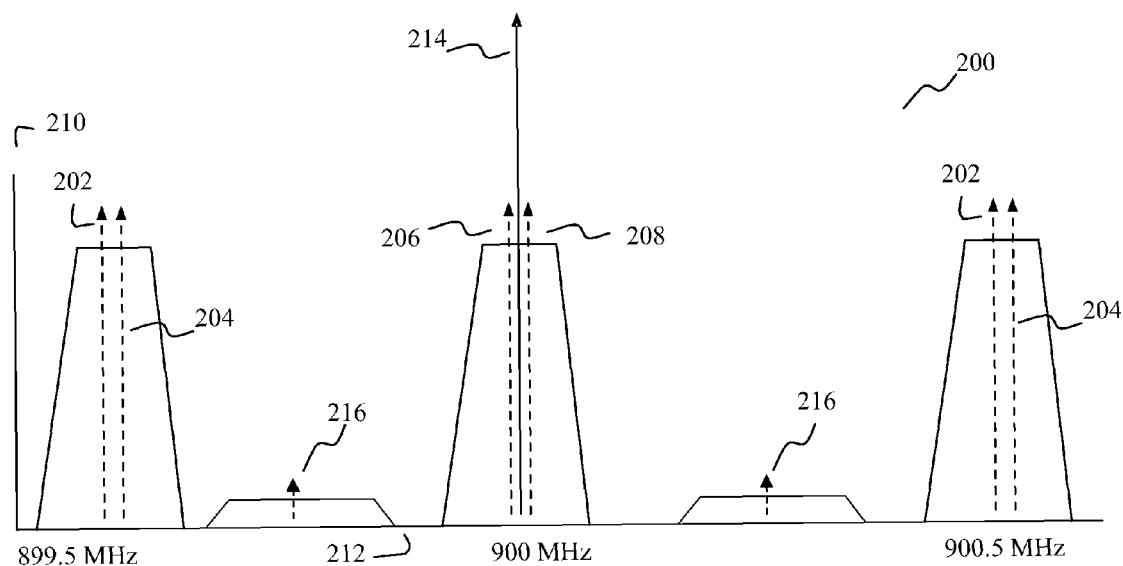
FIG. 2 is a graphical representation of signals in an embodiment of an RFID system.

FIG. 2 is a graphical representation of signals in an embodiment of an RFID system 200. On the graph, y-axis 210 represents amplitude, x-axis 212 represents frequency and relative signal strength is indicated by the height of the arrows on the graph. As discussed above, in a particular embodiment, an RFID reader may be operating in an environment in which there are other RFID readers present and that may be operating in the same frequency. In such an environment, multiple interfering signals may be present. The interfering signals may be continuous wave or modulated signals and may disrupt an RFID reader's ability to interpret information sent by an RFID tag.

In this system, relatively weak tag signals 216 may be degraded in the presence of interfering signals, such as, for instance, self-jammer 214, continuous wave adjacent channel blockers 202, modulated adjacent channel blockers 204, continuous wave co-channel blockers 206 and modulated co-channel blocker 208. In a particular embodiment, self-jammer 214 may share a frequency with co-channel blockers 206 and 208 making cancellation of both co-channel blockers 206 and 208 and self-jammer 214 difficult.

According to a particular embodiment, a self-jammer signal 214 may be strong. For instance, RFID reader 101 may be capable of transmitting a signal having 30 dBm of power and may have 15 dB of transmit-to-receive isolation. In this example, self-jammer signal 214 may have a power level of 15 dBm. Alternatively, a worst-case antenna reflection may generate an additional 15 dBm of reflected power that may add to a coupled carrier wave and may generate self-jammer signal 214 having 18 dBm of power.

In a particular embodiment, when an RFID tag sends a modulated tag signal to an RFID reader, the tag signals may be relatively weak in comparison to all other interfering signals. A cancellation mechanism for self-jammer signal 214 may enable detection of weak RFID tag signals by RFID reader 101.

Figure 3:
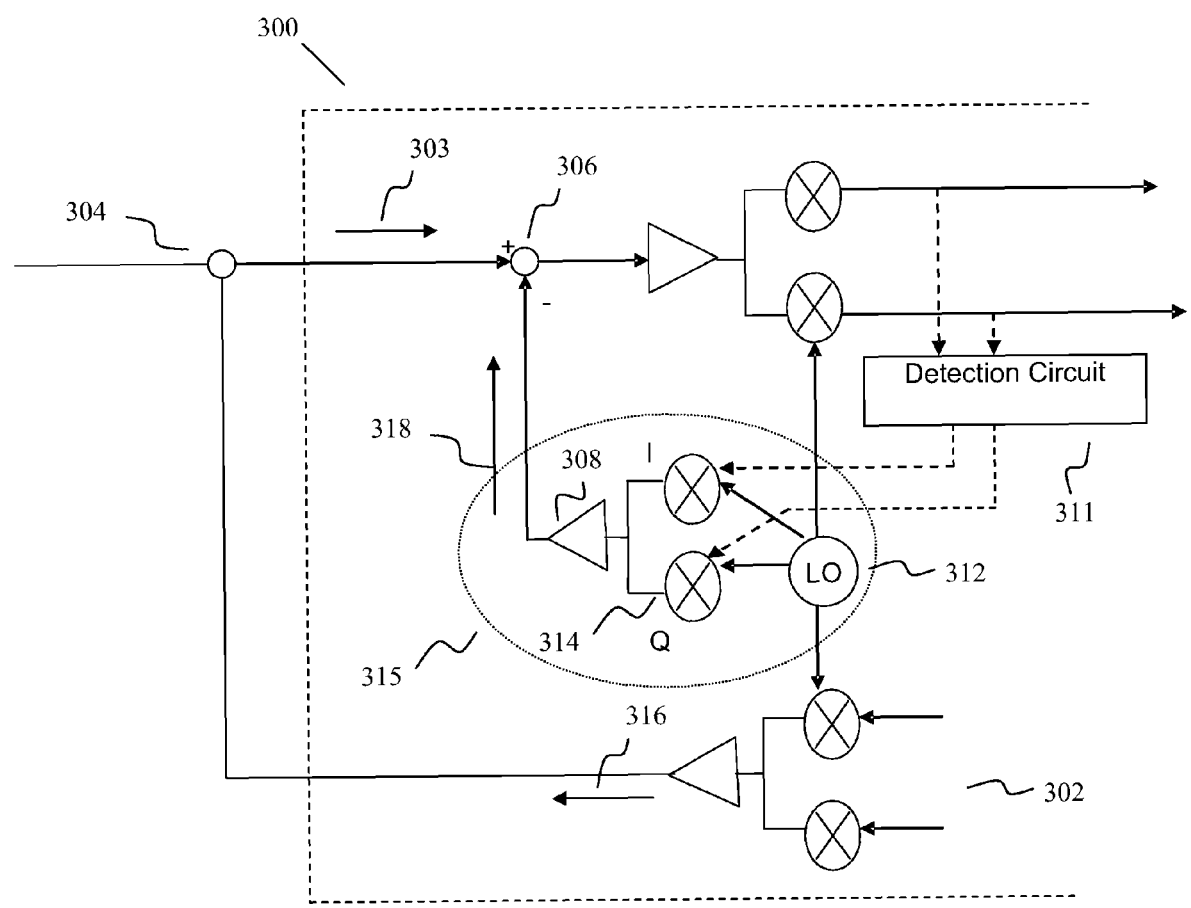
FIG. 3 is a block diagram illustrating a cancellation circuit for use in an RFID system in accordance with an embodiment of the present invention.

FIG. 3 is a block diagram depicting a particular embodiment of a self-jammer cancellation loop 300. According to a particular embodiment, cancellation loop 300 may be capable of detecting and canceling self-jammer signal 214 (referring to FIG. 2). In a particular embodiment, self-jammer cancellation loop 300 may be integrated into an already existing RFID reader integrated circuit (IC), thus enabling lower implementation cost. Such on-chip integration may be facilitated, for instance, by detecting self-jammer signal 214 power at the RFID reader baseband Additionally, using a cancellation source derived from a quadrature signal of local oscillator 312 may further enable on-chip integration because local oscillator 312 may be available on an existing RFID reader integrated circuit.

In a particular embodiment, cancellation loop 300 may comprise self-jammer detection circuit 311, local oscillator 312, amplifier 308 and mixer 314. Cancellation loop 300 may be a closed loop. In a particular embodiment, self-jammer signal 214 may be detected by RFID reader 101 in a self-jammer detection circuit 311. According to a particular embodiment, self-jammer detection circuit 311 may detect characteristics of a self-jammer signal by a variety of methods. In a particular embodiment, self-jammer detection circuit 311 may communicate self-jammer signal 214 characteristics to cancellation signal source 315. Such characteristics may comprise phase and/or amplitude. According to a particular embodiment, self-jammer signal 214 may be an amplitude and phase-shifted version of a transmitted carrier signal 316 output from transmitter 302. Cancellation signal 318 may be generated by changing the amplitude and phase of a signal generated by local oscillator 312. Such amplitude and phase change may be implemented in a variety of ways. For instance, the amplitude and phase of a signal generated by local oscillator 312 may be adjusted by amplifier 308 and mixer 314 to generate cancellation signal 318 that is about 180 degrees out of phase with self-jammer signal 214. This is, however, merely an example of a method of generating a cancellation signal and claimed subject matter is not so limited According to a particular embodiment, RFID reader 101 may receive signal 303 at receiver 304. In a particular embodiment, out-of-phase cancellation signal 318 may be summed at summing node 306 with signal 303, thus outphasing self-jammer signal 214. Received signal 303 may comprise tag data, self-jammer signal 214 as well as other interfering signals. In a particular embodiment, summing cancellation signal 318 with received signal 303 may substantially cancel the effect of self-jammer signal 214 and enable detection of tag data by RFID reader 101. This however, merely an example of a method of canceling a self-jammer signal and claimed subject matter is not so limited.

Figure 4:
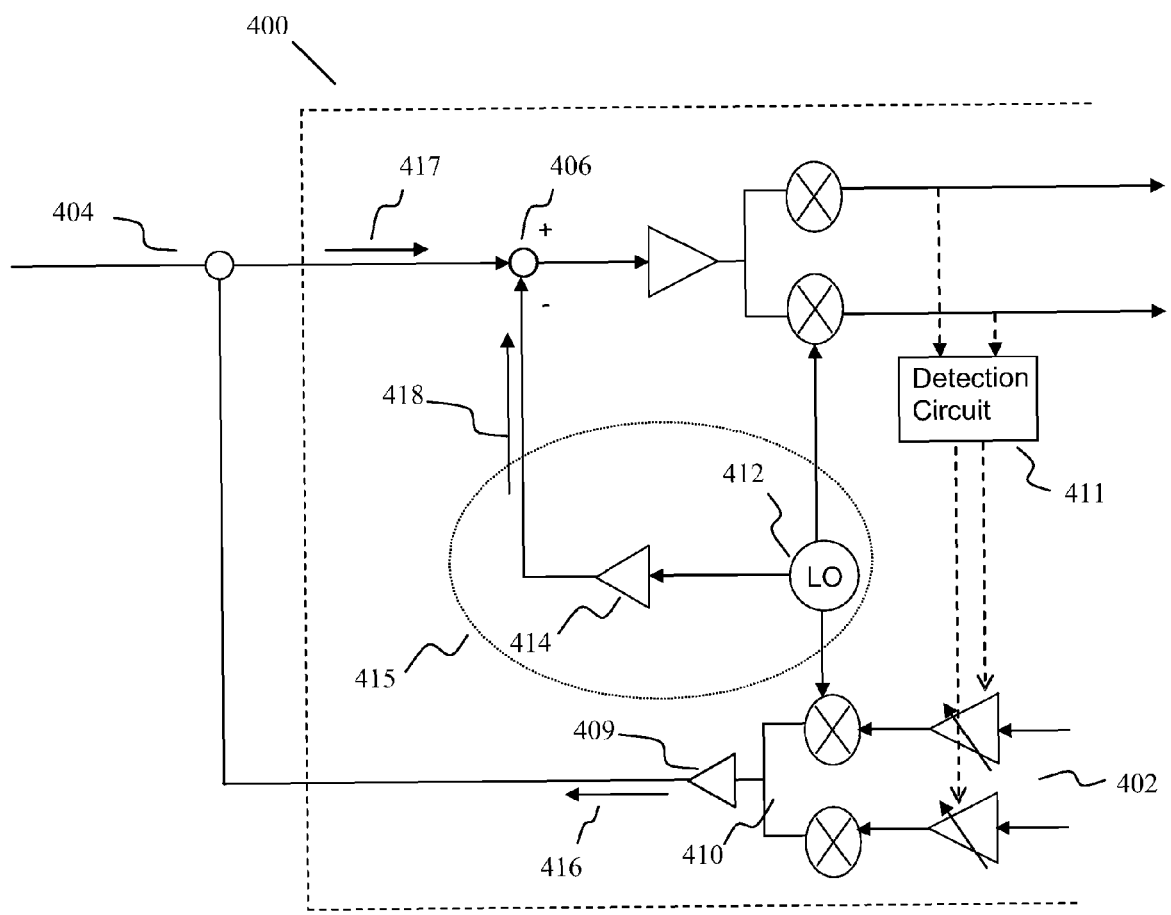
FIG. 4 is a block diagram illustrating a cancellation circuit for use in an RFID system in accordance with an embodiment of the present invention.

FIG. 4 is a block diagram depicting a particular embodiment of a self-jammer cancellation loop 400. In a particular embodiment, cancellation loop 400 may be capable of detecting and canceling self-jammer signal 214. Similar to cancellation loop 300 above, in a particular embodiment, self-jammer cancellation loop 400 may be integrated into an already existing RFID reader IC, thus enabling lower implementation cost. As discussed above, such on-chip integration may be facilitated, for instance, by detecting self-jammer signal 214 power at the RFID reader baseband. Additionally, cancellation source 415 may be derived from local oscillator 412 and amplifier 414, which may also be available on a WID reader integrated circuit.

In a particular embodiment, cancellation loop 400 may be a closed loop capable of canceling self-jammer signal 214. Cancellation loop 400 may comprise a self-jammer detection circuit 411, a cancellation source 415 and transmitter 402. According to a particular embodiment, RFID reader 101 may transmit signal 416 via transmitter 402. Transmitter 402 may comprise mixer 410 and amplifier 409. In a particular embodiment, a first self-jammer signal (not shown) may be detected by RFID reader 101 at $t_1$, in self-jammer detection circuit 411. In a particular embodiment, self-jammer detection circuit 411 may detect a first self-jammer signal by a variety of methods. According to a particular embodiment, self-jammer detection circuit 411 may communicate first self-jammer signal characteristics to transmitter 402. Such characteristics may comprise first self-jammer phase and/or amplitude information. In a particular embodiment, transmitter 402 may generate transmit signal 416 which may, substantially, be a phase-shifted version of first self-jammer signal 214. Before transmission of transmit signal 416, in a particular embodiment, up-conversion mixer 410 may shift the phase of transmit signal 416 about 180 degrees out of phase with the first self-jammer signal. In a particular embodiment, transmit signal 416 will now also be 180 degrees out of phase with the signal generated by local oscillator 412. In a particular embodiment, the amplitude of transmit signal 416 may be adjusted by amplifier 409 to replicate the amplitude of first self-jammer signal. Additionally, because the first self-jammer signal is a phase- and amplitude-shifted version of a signal transmitted from RFID reader 101, the first self-jammer signal may no longer exist as an interfering signal when RFID reader 101 begins transmitting the phase and amplitude shifted transmit signal 416. This is, however, merely an example of a method of shifting and amplifying a transmit signal and claimed subject matter is not so limited.

In a particular embodiment, as described above, RFID reader 101 may transmit signal 416 via transmitter 402 and receive signal 417 at receiver 404 at time $t_2$. According to a particular embodiment, time $t_2$ may be a time later than time $t_1$. Received signal 417 may be similar to transmitted signal 416 and may comprise a second self-jammer signal, tag data and other interfering signals. In a particular embodiment, cancellation signal 418 may be generated by cancellation source 415. Such a cancellation source may comprise local oscillator 412 and amplifier 414. In a particular embodiment, cancellation signal 418 may be generated by local oscillator 412 and may be amplified by amplifier 414. According to a particular embodiment, amplitude adjustment may be based in part on information detected in detection circuit 411. Cancellation of a second self-jammer signal (not shown) may be accomplished by out-phasing. In a particular embodiment, cancellation signal 418 and received signal 417 may be summed at summing node 406. Summing may cancel the effect of the second self-jammer signal. This is, however, merely an example of a method of canceling a self-jammer signal by out-phasing using a signal generated by a local oscillator and claimed subject matter is not so limited.

While certain features of claimed subject matter have been illustrated as described herein, many modifications, substitutions, changes and equivalents will now occur to those skilled in the art. It is, therefore, to be understood that the appended claims are intended to cover all such embodiments and changes as fall within the true spirit of claimed subject matter.

What is claimed is:

1. A method for canceling self-jammer signals in a radio frequency identification (RFID) system, comprising:
    generating a first radio-frequency signal comprising a signal generated at a local oscillator of an RFID reader;
    transmitting the first radio-frequency signal;
    receiving a second radio-frequency signal comprising one or more self-jammer signals, the one or more self-jammer signals comprising the transmitted signal;
    detecting characteristics of the one or more self-jammer signals;
    generating a self-jammer cancellation signal comprising the signal generated at the local oscillator and based, at least in part, on the detected characteristics of the one or more self-jammer signals;
    canceling the one or more self-jammer signals in a cancellation loop, wherein canceling the one or more self-jammer signals comprises out-phasing the self-jammer signal with the self-jammer cancellation signal; and
    shifting a phase of a transmit signal based at least in part on characteristics detected in the detection circuit.

2. The method of claim 1, wherein generating the self-jammer cancellation signal further comprises shifting the phase of the self-jammer cancellation signal based, at least in part, on the detected characteristics of the one or more self-jammer signals.

3. The method of claim 1, wherein generating the self-jammer cancellation signal further comprises adjusting the amplitude of the self-jammer cancellation signal based, at least in part, on the detected characteristics of the one or more self-jammer signals.

4. The method of claim 1, wherein generating a first radio-frequency signal further comprises shifting the phase of the signal generated by the local oscillator 180 degrees.

5. An apparatus capable of canceling self-jammer signals, comprising:
    a self-jammer cancellation circuit for canceling a self-jammer signal using a signal generated by a local oscillator, wherein the self-jammer cancellation circuit comprises:
        a receiver coupled to a detection circuit, the receiver capable of receiving a radio-frequency signal comprising one or more self-jammer signals and further capable of communicating the radio-frequency signal to the detection circuit;
        the detection circuit coupled to a local oscillator, the detection circuit capable of detecting characteristics of the one or more self-jammer signals and communicating the characteristics to a controller of the local oscillator;
    the local oscillator coupled to a summing node, the local oscillator capable of generating a self-jammer cancellation signal;
    the summing node capable of out-phasing the one or more self-jammer signals with the self-jammer cancellation signal; and
    a transmitter coupled to the detection circuit, the transmitter comprising an up-conversion mixer capable of shifting a phase of a transmit signal based at least in part on characteristics detected in the detection circuit.

6. The apparatus of claim 5, further comprising a mixer coupled to the local oscillator capable of shifting the cancellation signal 180 degrees out of phase with the one or more self-jammer signals.

7. The apparatus of claim 5, wherein the receiver further comprises an antenna for receiving the radio-frequency signal.

8. The apparatus of claim 6, wherein the receiver further comprises an antenna for receiving the radio-frequency signal.

9. The method of claim 2, wherein generating the self-jammer cancellation signal further comprises adjusting the amplitude of the self-jammer cancellation signal based, at least in part, on the detected characteristics of the one or more self-jammer signals.

10. The method of claim 9, wherein generating a first radio-frequency signal further comprises shifting the phase of the signal generated by the local oscillator 180 degrees.

11. The method of claim 3, wherein generating the self-jammer cancellation signal further comprises shifting the phase of the self-jammer cancellation signal based, at least in part, on the detected characteristics of the one or more self-jammer signals.

12. The method of claim 11, wherein generating a first radio-frequency signal further comprises shifting the phase of the signal generated by the local oscillator 180 degrees.

* * * * *